United States Patent

[11] 3,543,715

| [72] | Inventor | James W. D. Hill |
| | | 2214 Wentworth Ave., Dallas, Texas 75208 |
| [21] | Appl. No. | 849,062 |
| [22] | Filed | Aug. 11, 1969 |
| [45] | Patented | Dec. 1, 1970 |

[54] INFLATION TESTING SYSTEM
1 Claim, 2 Drawing Figs.

[52] U.S. Cl. ............................................. 116/67;
74/543; 84/422; 116/34; 145/29; 273/67
[51] Int. Cl. ............................................. G08b 3/00
[50] Field of Search .......................... 116/34, 67;
73/146.12, 67; 145/29—2, 29, 36, 30; 273/84, 67;
74/543; 84/422, 324

[56] References Cited
UNITED STATES PATENTS

| 586,323 | 7/1897 | Stermkopf, Jr. ............. | 145/36 |
| 1,130,657 | 3/1915 | Armstrong .................. | 73/12 |
| 1,298,382 | 3/1919 | Packer ....................... | 145/36 |
| 1,547,075 | 7/1925 | Smither ...................... | 273/67 |
| 1,909,932 | 5/1933 | Digel ........................... | 273/84 |
| 2,121,989 | 6/1938 | Schnase et al. ............... | 74/543 |
| 2,204,789 | 6/1940 | Bredow ....................... | 273/84 |
| 2,571,409 | 10/1951 | Beyers et al. ................ | 73/69 |
| 2,853,912 | 9/1958 | Gladstone .................... | 84/422 |
| 3,097,523 | 7/1963 | Diamond et al. ............. | 73/69 |
| 3,385,334 | 5/1968 | Clay ............................. | 145/29X |

FOREIGN PATENTS

| 996,383 | 6/1965 | Great Britain ............... | 145/36 |

Primary Examiner—Louis J. Capozi
Attorney—Richards, Harris & Hubbard

ABSTRACT: A system for testing the state of inflation of pneumatic tires includes a tire striker comprising a length resilient tubing having a body of lead molded around it. In use, the inflation of a tire is tested by striking the tire with the body of lead. The resulting sound is indicative of the state of inflation of the tire.

Patented Dec. 1, 1970
3,543,715
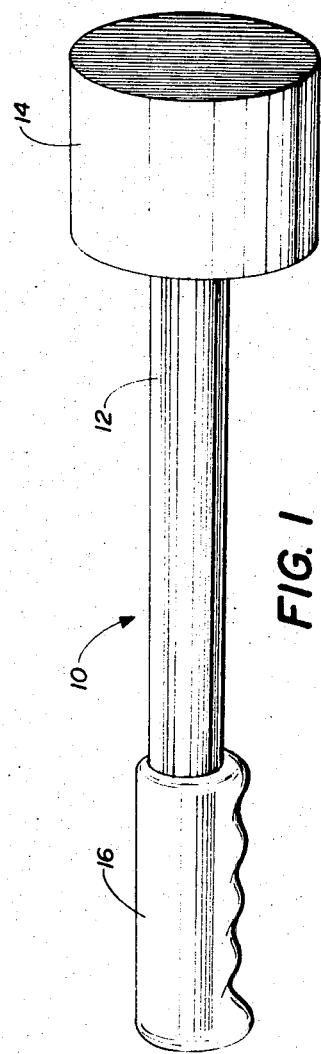
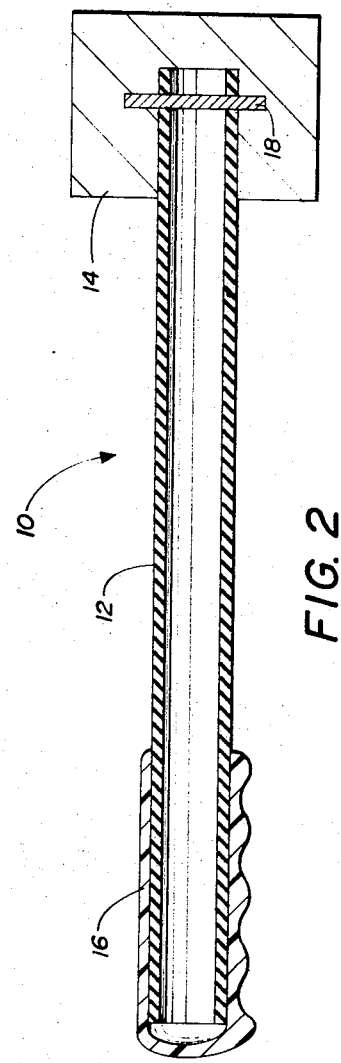
INVENTOR
JAMES W. D. HILL
Richards, Harris & Hubbard
ATTORNEY

3,543,715

INFLATION TESTING SYSTEM

BACKGROUND OF THE INVENTION

In the trucking industry, it is common to test the state of inflation of the tires of a truck at periodic intervals during a run. Heretofore, such tests have usually been conducted by applying an air gage to the valve of each tire. This procedure provides an accurate test but is time consuming. Also, it is sometimes difficult to apply a gage to the valves of particular tires.

The inflation of truck tires has also been tested by striking the tires with ball peen hammers. This action produces a noise or sound that is indicative of tire inflation. However, when a hammer is employed as a tire striking device, the resulting tone is muffled to such an extent that the test is not sufficiently accurate to be of value.

This invention relates to an inflation testing system in which tires are struck with an improved tire striker comprising a body of lead molded around a length of resilient tubing. The resulting sound provides a highly accurate indication of tire inflation. Use of the system permits the testing of the state of inflation of the tires of a struck by simply hitting each tire with the tire striker.

SUMMARY OF THE INVENTION

In the preferred embodiment, this invention comprises an inflation testing system in which tires are struck by a tire striker comprising a body of hard material mounted on a flexible support. Preferably, the striker includes a body of lead molded around a resilient shaft.

DESCRIPTION OF THE DRAWING

A more complete understanding of the invention may be had by referring to the following Detailed Description when taken in conjunction with the drawing, wherein:

FIG. 1 is a perspective view of a tire striker useful in the practice in the invention; and FIG. 2 is a longitudinal sectional view of the tire striker illustrated in the FIG. 1.

DETAILED DESCRIPTION

Referring now to the drawing, an inflation testing system employing the invention is shown. In accordance with the invention, a tire striker 10 is rapped smartly against pneumatic tires such as truck tires and the like to produce a noise or sound indicative of the state of inflation of the tire. The use of the system produces an accurate indication of tire inflation without the necessity of applying a gage to the valve of the tire.

The striker 10 includes a resilient shaft 12 having a tire striker member 14 mounted on one of its ends and having a handle 16 mounted on the other side of its ends. The shaft 12 may be comprised of rubber, plastic or any of the various resilient metals and may be either solid or hollow. The shaft 12 is preferably comprised of a length of rubber tubing of the type employed in air hoses and the like.

The shaft 12 has a retaining pin 18 mounted in it. The tire-striking member 14 is formed from a hard material and is secured to the shaft 12 by engagement with the pin 18. Preferably, the tire-striker member 14 is comprised of a cylinder of lead molded around the shaft 12 and the pin 18.

In the embodiment shown, the handle 16 is comprised of a conventional bicycle handle grip that is secured to the shaft 12 by a suitable adhesive. Of course, the handle 16 can be formed in any convenient manner. For example, the handle 16 can be formed integrally with the shaft 12, if desired.

In the use of the inflation system, the tire striker 10 is maintained in the cab of a truck or in the pocket of a truck driver. At periodic intervals during a run, the truck driver tests the state of inflation of each tire of the truck by gripping the handle 16 of the tire striker 10 and hitting each tire of the truck with the tire striking member 14. When the tire striking member 14 is rapped smartly against a pneumatic tire, a noise or sound results. The pitch and tone of this sound corresponds directly to the state of inflation of the tire. Thus, a high pitched, ringing sound indicates a properly inflated tire. Conversely, a dull thud indicates an underinflated tire.

The tire striker illustrated in the drawing produces a sound that is a more accurate indication of the state of inflation of a tire than is the sound produced by other tire-striking devices, such as ball peen hammers. The reason for this improved accuracy is not fully understood, however, it is believed that the resilient nature of the shaft 12 and the fabrication of the tire-striking member 14 by molding lead around the shaft 12 contribute to the result. In any event, when the tire striker illustrated in the drawing is employed, it is possible to determine the state of inflation of a tire to within 25 pounds per square inch of the true value by simple striking the tire and listening to the resulting sound.

Although only one embodiment of the invention is illustrated in the drawing and described herein, it will be understood that the invention is not limited to the embodiment disclosed but is capable of rearrangement, modification, and substitution of parts and elements without departing from the spirit of the invention.

I claim:

1. A hammer for determining the state of inflation of pneumatic tires comprising:

a tire-striker member comprising a cylindrical body of lead having a blind bore formed along the central axis thereof and extending through one face thereof;

a striker member-supporting shaft formed of a length of flexible rubber hose and having one end thereof received within the blind bore in the striker member;

a blind cross bore formed in both the striker member and the shaft, said cross bore extending perpendicular to the axis of said blind bore;

a pin received within said blind cross bore to lock the shaft to the striker member; and a hand grip attached to the end of the shaft remote from the striker member, whereby the state of inflation of a tire may be determined by the sound emitted from the tire after delivery of of a blow to the tire from the body of lead.